8896X
W. Jones,
Wood Auger.
Patented June 15, 1835.
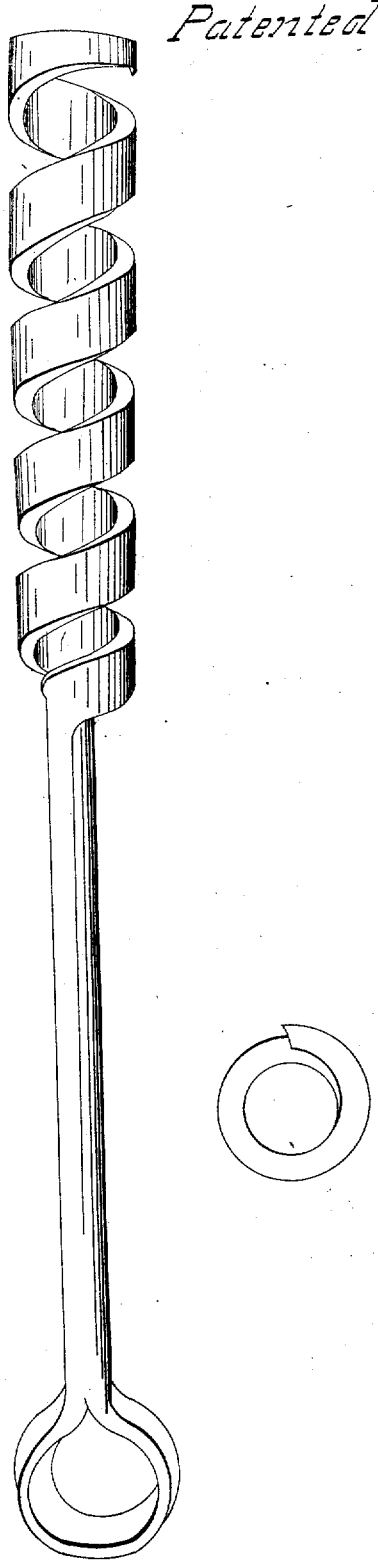
AM. PHOTO-LITHO. CO. N.Y. (OSBORNE'S PROCESS)

William Jones a Citizen of the United States

Letters Patent.

The Schedule referred to in these Letters Patent and making part of the same, containing a description in the words of the said William Jones himself of his improvement in the Auger.

Specification for an improvement in the Auger to be used for removing the plank &c. from ships or vessels requiring repairs This improvement is a hollow Auger made so as to embrace the bolts or fastenings in ships or vessels and to cut the wood from around them, by which means the plank &c. can be removed, without the delay, trouble, and expense usually required by splitting them out.

Witnesses
Ch. A Grice
Jas A. Williams

Wm Jones.

125 [illegible]

(Drawing)

Exd
[illegible]